United States Patent [19]

Noda

[11] 4,369,936
[45] Jan. 25, 1983

[54] FISHING REEL CLUTCH CONTROL MECHANISM

[75] Inventor: Hideo Noda, Sakai, Japan

[73] Assignee: Shimano Industrial Company Limited, Osaka, Japan

[21] Appl. No.: 250,035

[22] Filed: Apr. 1, 1981

[51] Int. Cl.³ .............................................. A01K 89/02
[52] U.S. Cl. ................................... 242/220; 192/67 R
[58] Field of Search .............. 242/211, 212, 213, 214, 242/215, 216, 217, 218, 219, 220, 221, 84.5 R, 84.51 R; 192/67 R, 93 A

[56] References Cited

U.S. PATENT DOCUMENTS

| | | | | |
|---|---|---|---|---|
| 2,130,581 | 9/1938 | Case | ...................................... | 242/220 |
| 3,971,529 | 7/1976 | Dörbandt | ............................ | 242/211 |
| 4,168,812 | 9/1979 | Karlsson | .............................. | 242/220 |
| 4,179,084 | 12/1979 | Noda | ................................ | 242/220 X |
| 4,281,808 | 8/1981 | Noda | ................................ | 242/220 X |

Primary Examiner—Billy S. Taylor
Attorney, Agent, or Firm—Stevens, Davis, Miller & Mosher

[57] ABSTRACT

A clutch control mechanism is provided for a fishing reel which has a spool shaft having a spool and supported to a stationary member. The spool shaft is connected through a transmitting mechanism having a clutch to a handle supported to the stationary member. A clutch lever supported to the stationary member is controlled to move forward to switch the clutch from on to off, and the clutch lever engages with protuberances at a return plate to move backward to thereby switch the clutch from off to on, the protuberance at the return plate engaging with the clutch lever at a side of mounting the stationary member onto a fishing rod with respect to the spool shaft.

3 Claims, 8 Drawing Figures

FISHING REEL CLUTCH CONTROL MECHANISM

FIELD OF THE INVENTION

This invention relates to a clutch control mechanism for a fishing reel, and more particularly to a clutch control mechanism for a fishing reel which has a stationary member fixed to a fishing rod, the stationary member rotatably supporting a handle and a spool shaft having a spool, the spool shaft being connected to the handle through a transmitting mechanism having a clutch means.

BACKGROUND OF THE INVENTION

Generally, this kind of clutch control mechanism for a fishing reel is so constructed that a clutch lever, which on-off controls the clutch means, is supported to the stationary member in relation of being reciprocal, the clutch lever is provided with a torsion spring for biasing the lever forwardly and backwardly, and a return plate having a plurality of protuberances engageable with the clutch lever is supported rotatably to the stationary member, so that the clutch lever is operated forwardly to switch-off the clutch means and biased by the torsion spring so as to be kept at the end of its forward movement, and the handle is operated to rotate the return plate so as to allow the protuberances to strike the clutch lever, thereby returning the clutch lever against the torsion spring, thus switching-on the clutch means and keeping the clutch lever at the end of its backward movement.

The aforesaid clutch control mechanism described above allows the protuberance at the return plate to be positioned on the path of reciprocating movement of the clutch lever. In this instance, the clutch lever, when moving forward, occasionally strikes a protuberance, thereby being restrained from forward movement and making it difficult to switch-off the clutch means.

To solve this problem, a spring is conventionally used instead of the torsion spring, for biasing the clutch lever always backwardly, a retaining device is used for retaining the clutch lever at its forward movement end, a pawl is provided swingably at the utmost end of the clutch lever in the forward movement direction thereof, and a pawl control is provided at the clutch lever in relation of swinging only in the backwardly moving direction of the clutch lever and not in the forwardly moving direction, so that the retaining device retains the clutch lever at the forward movment end thereof, while, when the handle is turned, the protuberance at the return plate engages with the pawl to release the clutch lever at the forward movement end from the retaining device, thereby moving the clutch lever backwardly.

The clutch control mechanism just described, however, has the following problems: the movement of the protuberance at the return plate in the same direction as the forward movement of the clutch lever is used for the backward movement of the clutch lever, whereby the pawl must be provided at the clutch lever at the reverse side to the reel mounting side on a fishing rod with respect to the spool shaft. However, an anti-reverse-rotation mechanism is provided at the reverse side to the fishing rod, so that a large space must be provided at the reverse side of the clutch lever causing the reel to become larger as a whole.

SUMMARY OF THE INVENTION

In the light of the aforesaid problems, this invention has been designed. An object of the invention is to provide a clutch control mechanism which can always perform a sure and smooth switching of the clutch on or off, because the forward movement of a clutch lever is not hindered by protuberances at a return plate.

Another object of the invention is to provide a clutch control mechanism which can provide the clutch lever and an anti-reverse-rotation mechanism within a restricted space at a stationary member while the anti-reverse-rotation mechanism is controllable without hindrance.

The clutch control mechanism of the invention is provided with a clutch lever which is supported to a stationary member in relation of being movable forwardly and backwardly and swingable, and has a pawl to on-off control the clutch means, a retaining mechanism for retaining the clutch lever at its forward end, a first spring for biasing the clutch lever in its backward movement direction and in the retaining direction by the retaining mechanism, and a return plate having a plurality of protuberances which rotate following the rotation of a transmitting mechanism, engage with the pawl, and allow the clutch lever to swing, thereby releasing the lever from the retaining mechanism. This invention is characterized in that the pawl is mounted on the clutch lever at the utmost end thereof in the forward movement direction and at a side of mounting the stationary member onto a fishing rod, and is opposite to the revolving direction of the protuberances which resolve following the rotation of transmitting mechanism.

These and other objects of the invention will become more apparent in the detailed description and examples which follow.

DETAILED DESCRIPTION OF THE INVENTION

Figure 1:
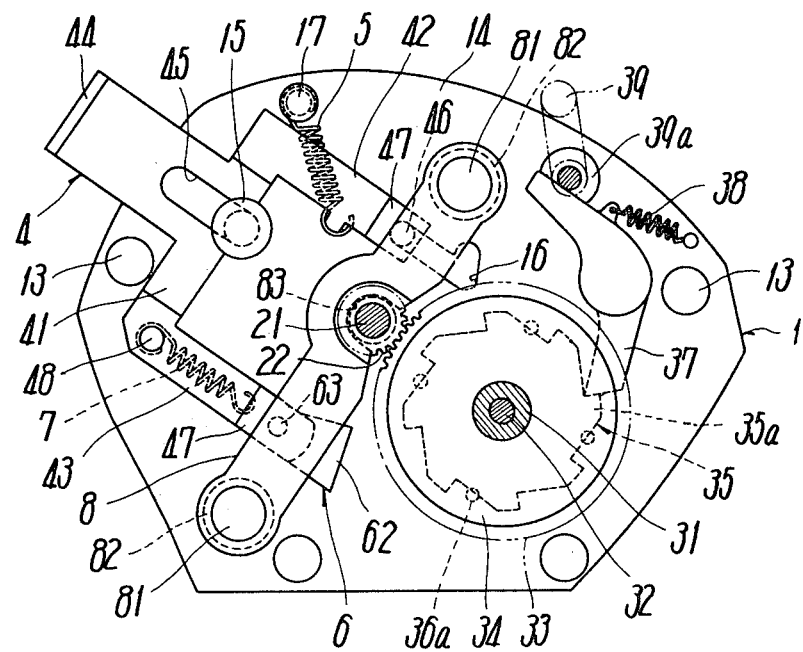
FIG. 1 is a partially omitted side view of an embodiment of a clutch control mechanism of the invention, which is incorporated in a fishing reel.
Figure 2:
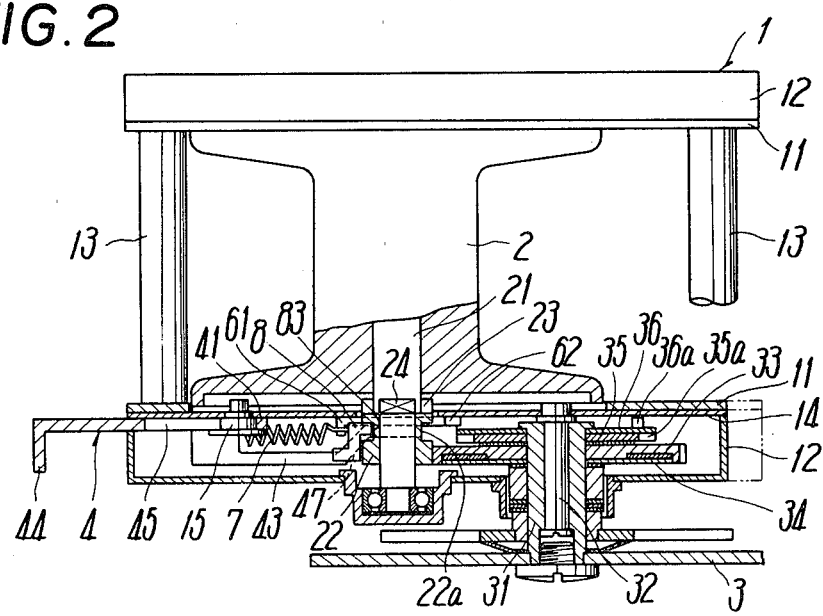
FIG. 2 is a partially omitted plan view of the FIG. 1 embodiment.

Referring to FIGS. 1 and 2, reference numeral 1 generally designates a stationary member fixed to a fishing rod (not shown). The stationary member includes a pair of main plates 11 opposite to each other at a regular interval, a cover 12 fixed to the outside of each plate 11, and a plurality of connecting rods 13 for connecting the main plates 11. One cover 12 is fixed to one main plate 11 through a support plate 14.

A spool 2 is sleeved onto a spool shaft 21 and fixed thereto. The spool shaft 21 projects at its both axial ends from the spool 2, is journalled to the covers 12 so as to carry the spool 2 between the main plates 11, and has a clutch means for transmitting or cutting-off a driving force to the spool shaft 21.

A pinion gear 22 is inserted axially movably onto the one projecting end of spool shaft 21 within a space enclosed by the main plate 11 having the support plate 14 and by the cover 12 fixed thereto. The clutch means comprises radial recesses 23 at the inner periphery of pinion 22 at an axially inner end thereof, and flat faces 24 at an intermediate portion of the spool shaft 21. The pinion 22 axially moves to engage the recesses 23 with the flat faces 24 to couple (switch on) the clutch means, so the pinion 22 rotates integrally with the spool shaft 21. When the recesses 23 disengage from the flat faces 24, i.e., the clutch means is disconnected (switched off), the spool shaft 21 is free from the pinion 22. Thus, the clutch means is on-off controlled.

A handle shaft 31 is sleeved rotatably onto a support rod 32 fixed to the support plate 14, and projects outwardly from the cover 12 and a handle 3 is fixed thereat. On to the handle shaft 31 are fitted a drive gear 33 which is always in mesh with the pinion 22, a friction plate 34 abutting against the drive gear 33, an anti-reverse-rotation ratchet gear 35 having at its outer periphery a plurality of ratchet teeth 35a, and a return plate 36 having a plurality of protuberances 36a, the friction plate 34, ratchet gear 35 and return plate 36, being fitted to the handle shaft 31 not-rotatably with respect thereto but to be rotatable together therewith, the driver gear 33 being free from the handle shaft 31, so that the rotation of handle shaft 31 is transmitted to the drive gear 33 through the friction plate 34. An anti-reverse-rotation pawl 37 in mesh with the ratchet teeth 35a is pivoted to the support plate 14, and a spring 38 is provided thereat to always bias the pawl 37 to mesh with the ratchet teeth 35a. A control lever 39 has a cam 39a to restrain the pawl 37 from meshing with teeth 35a and is pivoted to the support plate 14, the cam 39a being rotated by the control lever 39 to thereby change over the anti-reverse-rotation pawl 37 so as not to engage with the gear 35. In addition, the press-contact strength of friction plate 34 against the drive gear 33 is adjusted to change the driving force applied to the spool 2. In other words, the spool 2, when subjected to a greater resistance, can come to a halt, or can reversely rotate regardless of the rotating control of handle 3.

A clutch lever 4 is supported to the support plate 14 in a manner permitting its reciprocation along the support plate 14, thereby on-off controlling the clutch means. The clutch lever 4 comprises a base 41, a pair of bars 42 and 43 extending from one side of the base 41, and a control element 44 extending from the other side of the same. At the base 41 is formed an elongate slot 45 extending in the moving direction of lever 4, and a guide 15 projects from the support plate 14, which is inserted into the slot 45. A pin 46 is mounted on the utmost end of one bar 42 at the clutch lever 4, and at the support plate 14 is provided a guide and retaining groove 16 extending in the reciprocating direction of clutch lever 4 and bending in a L-like shape at the utmost end, so that the pin 46 enters the groove 16 to thereby guide the clutch lever 4 in its forward movement. The clutch lever 4, at its forwad movement end, is allowed to swing around the guide 15, and the pin 46 is caught by the bent end of retaining groove 16 to thereby retain the lever 4 at the position where the forward movement of lever 4 is terminated. Also, the bard 42 and 43 at the lever 4 each have at the utmost end a slanted portion 47.

Furthermore, the clutch lever 4 is provided with a first spring 5 for biasing the lever 4 in the direction of backward movement thereof and of being retained to the bent end of retaining groove 16, and with a pawl 6 which is engageable with one protuberance 36a at the return plate 36 and functions to swings the lever 4 in the direction reverse to the retainment so as to release the lever 4 therefrom.

The spring 5 is interposed between an intermediate portion of bar 42 at a side opposite to the fishing rod with respect to the spool shaft 21 and a pin 17 provided at the support plate 14, thereby biasing the lever 4 in the direction of backward movement and retainment of the same.

Figure 3:
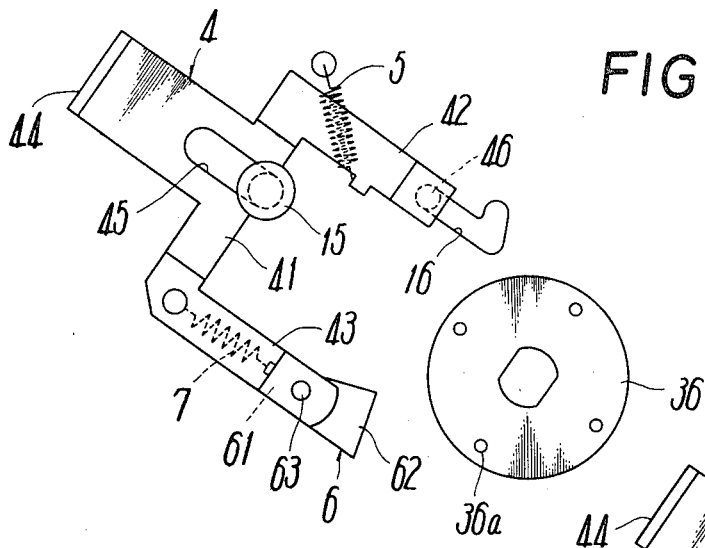
FIGS. 3 through 6 are views explanatory of working condition of the principal portion of the clutch control mechanism of the invention.

The pawl 6, as shown in FIG. 3, has a base 61 and an engaging portion 62 engageable with the protuberance 36a and is pivoted through a pin 63 to the utmost end of bar 43 at the fishing rod mounting side, the engaging portion 62 projecting from the utmost end of bar 43 and extending, when the clutch liner is retained by pin 46 in the bent portion of groove 16, to intercept and be pushed by protuberances 36a as they pass on rotation of return plate 36. The pawl 6 is adapted to abut against the protuberance 36a at the position rearward in the rotation direction of return plate 36 from the line connecting the pin 63 with the center of revolution of protuberance 36a, that is, the axis of rotation of handle shaft 31.

Also, the pawl 6 has a spring 7 to bias the same in a neutral position, the spring 7 being interposed between the base 61 of pawl 6 and a pin 48 projecting from the clutch lever 4.

The clutch lever 4 moves forwardly or backwardly to axially move the pinion 22 to perform the on-off control of the clutch means, in which the pinion 22 axially moves through a pinion holder 8. The pinion holder 8 is inserted at both ends thereof onto shafts 81 projecting from the support plate 14 at both sides of spool shaft 21 and extending in parallel thereto, and springs 82 are wound around the shafts 82 to bias the pinion holder 8 always toward the support plate 14. Hence, the holder 8 elastically contacts with the bars 42 and 43, so that when the clutch lever 4 moves forward, the slanted portions 47 reach the position corresponding to the holder 8 and move it against the springs 82. When the clutch lever 4 moves backward, the slanted portions 47 leave the aforesaid position to allow the holder 8 to return by means of the springs 82. The holder 8 has at its intermediate portion a cutout 83 which is fitted into an annular groove 22a formed at the pinion 22.

Hence, the holder 8 is moved by the slanted portions 47 and returns by means of the springs 82, thereby moving the pinion 22 axially to-and-fro along the spool shaft 21. Thus, the clutch means is on-off controlled, in other words, the recesses 23 engage with or disengage from the flat faces 24.

The fishing reel constructed as foregoing, when winding a fishing line onto the spool 2, keeps the clutch means in a condition of being on, in other words, the clutch lever 4 is positioned at the backward movement end and the recesses 23 at the pinion 22 engage with the flat faces 24 at the spool shaft 21. Hence, the handle 3 rotates to transmit its rotation from the handle shaft 31 to the spool shaft 21 through the friction plate 34, drive gear 33, pinion 22, recesses 23, and flat faces 24, thereby rotating the spool 2 to wind thereon the fishing line.

On the other hand, when the line is intended to be drawn out of the spool 2 for casting, the clutch means is switched-off by disengaging the recesses 23 from the flat faces 24. For this purpose, the control element 44 at the clutch lever 4 is pushed to move the lever 4 forwardly against the first spring 5, so that the slanted portions 47 move to reach the position corresponding to the pinion holder 8, thereby forcing the holder 8 to move against the springs 82, thus axially moving the pinion 22 to disengage the recesses 23 from the flat faces 24. Hence, the spool shaft 21 is free with respect to the handle 3, at which time the clutch lever 4, at its forward movement end, is pulled by the first spring 5 to swing around the guide 15 in the direction of being retained, so that the pin 46 moves to engage with the bent portion of retaining groove 16, thereby retaining the lever 4 at its forwad movement end. Therefore, the line can be drawn out of the spool 2 for casting.

When the clutch lever 4 is retained at its forward movement end, the pawl 6 enters the path of revolution of each protuberance 36a at the return plate 36 and is ready to move the lever 4 backwardly through the rotation of handle 3. The pawl 6, if the protuberance 36a moves to half the swinging motion of pawl 6, will strike the protuberance 36a, but swing against the second spring 7 (FIG. 6) as the clutch lever swings under action of the pin 46 and groove 16 because of being pivoted swingably to the bar 43, thereby not hindering the clutch lever 4 from swinging around the guide 15 in the direction of being retained. After the protuberance 36a revolves following the return plate 36 and leaves the aforesaid position, the pawl 6 returns to a neutral position by means of the spring 7, thereby being ready for the backward movement of lever 4.

Next, when the fishing line is rewound onto the spool 2, the clutch lever 4 need not be operated, but it is enough to turn the handle 3 only. In detail, the handle 3 is turned to rotate the return plate 36 through the handle shaft 31, so that the protuberance 36a engages with the pawl 6 to swing the clutch lever 4 around the guide 15 reversely to the retainment direction. Hence, the pin 46 disengages from the bent portion of retaining groove 16, whereby the lever 4 is released from the retainment to move backwardly by means of the force of the first spring 5. Also, the slanted portions 47 leave the holder 8, so that the holder 8 moves toward the support plate 14 by the springs 82, thereby engaging the recesses 23 with the flat faces 24 and switching-on the clutch means. Hence, the handle 3 is turned to rotate the spool 2 for winding thereon the fishing line.

Next, the swinging motion of pawl 6 when the clutch lever 4 swings in the direction of being retained and the protuberance 36a abuts against the pawl 6, and the swinging motion of the lever 4 reverse to the direction of being retained when the protuberance 36a revolves following the return plate 36 and engages with the pawl 6, will be detailed in accordance with FIGS. 3 through 7.

When the clutch means is coupled to put the reel in a condition of winding the fishing line on the spool 2, the clutch lever 4, as shown in FIG. 3, is biased toward its backward movement end by the spring 5, and kept there due to engagement of the guide 15 with an end of slot 45 and that of the pin 46 with the guide and retaining groove 16.

Figure 4:
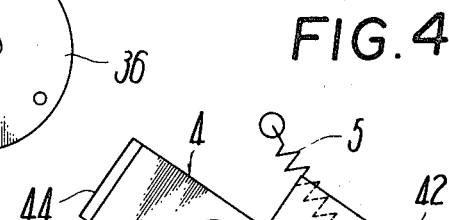

The clutch lever 4 is operated to move forward stably through the slot 45 and pin 46, guided by the guide 15 and retaining groove 16 respectively, and shifts against the first spring 5 to the position shown in FIG. 4 from that in FIG. 3.

Figure 5:
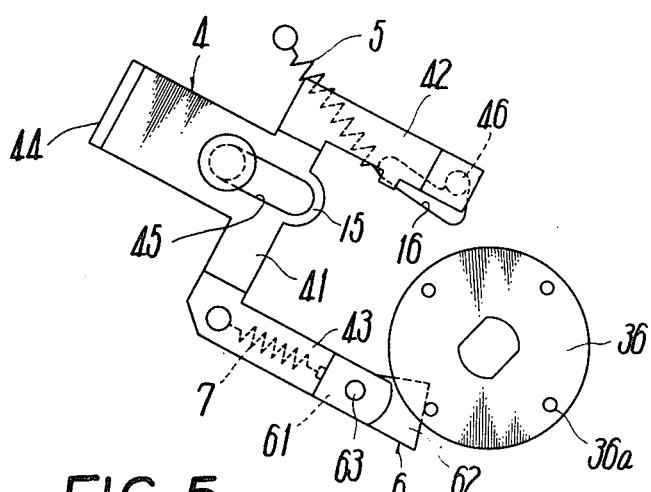

Next, the first spring 5 restores to allow the clutch lever 4 to swing around the guide 15 in the direction of being retained (in the direction of the arrow in FIG. 4) and shift to the position in FIG. 5 from in FIG. 4, so that the pin 46 engages with the bent portion of groove 16 to retain the lever 4 at its forward movement end and the pawl 6 intersects the path of the revolving protuberance 36a.

Figure 6:
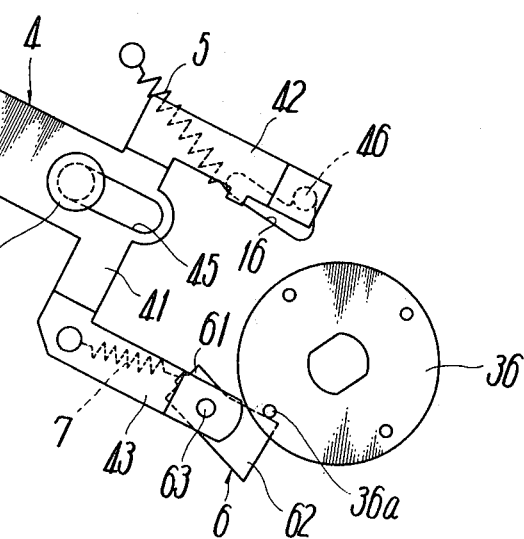
Figure 7:
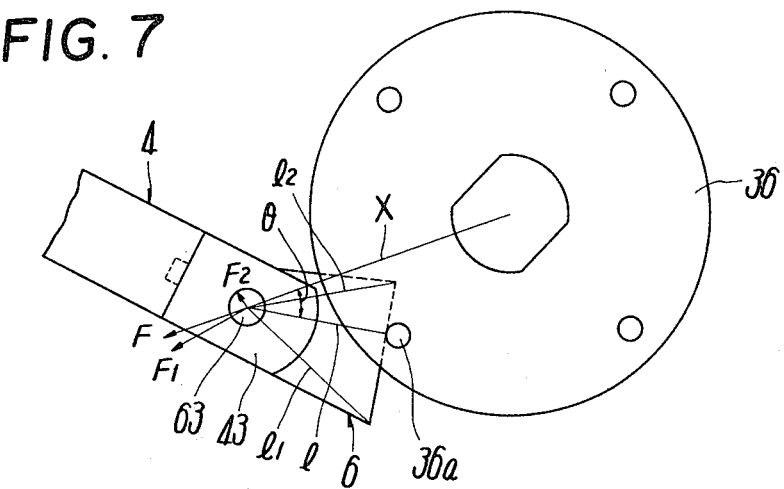
FIG. 7 is an enlarged view explanatory of an operation for the clutch control mechanism during its backward movement.

At this time, the protuberance 36a, if positioned within a range of swinging motion of the pawl 6, strikes the pawl 6 and swings it as shown in FIG. 6. Next, when the return plate 36 is rotated by the handle 3 to revolve the protuberance 36a from the position shown in FIG. 6, the second spring 7 acts to restore the pawl 6, whereby the pawl 6 can intersect the path of revolution of protuberance 36a.

Thus, the protuberance 36a revolves following the return plate 36 to engage with the pawl 6, so that the clutch lever 4 is released from its retainment at the forward movement to thereby return to the position shown in FIG. 1.

In order to perform the above operation, the components of the clutch control mechanism are arranged in accordance with the following prescribed conditions.

The position where the pawl 6 engages with the protuberance 36a is set to be rearward in the direction of revolution thereof with respect to a straight line X connecting the center of swinging motion of pawl 6 and the center of revolution of protuberance 36a.

A straight line l connecting the aforesaid engagement position and the center of swinging motion of pawl 6, is set to be smaller in length than straight lines $l_1$ and $l_2$ connecting the center of swinging motion of pawl 6 and both ends of the engaging portion 62 at the pawl 6 respectively.

An angle determined by the lines X and l, is set to be smaller than 90 degrees and larger than 0 degrees.

In the construction given the above setting conditions, the pawl 6 swings around the pin 63 following rotation of the protuberance 36a, at which time the engagement position of pawl 6 with protuberance 36a is not changed. The path of swinging motion of the engagement position and that of revolution of protuberance 36a, overlap with each other partially before the line X in the revolution direction of the protuberance 36a and to a maximum at the line X. Therefore, the overlapping applies a force F to the pawl 6 from the protuberance 36a through the engagement of pawl 6 with protuberance 36a, the force F acting to move the pin 63, in turn the clutch lever 4, away from the center of revolution of protuberance 36a. The force F is divided into components of force $F_1$ and $F_2$, the component of force $F_1$ acting on the clutch lever 4 to move reversely to the direction of its being retained and being larger than a tension of the first spring 5. When the protuberance 36a in engagement with the pawl 6 approaches the line X, the component $F_1$ becomes larger to swing the clutch lever 4, so that the pin 46 disengages from the bent portion of retaining groove 16, thus releasing the clutch lever 4 from its retainment at the forward movement end. In addition, the force F is derived from the rotating force of handle 3, from which it will be easily understandable that the component $F_1$ is larger than the tension of first spring 5.

If the protuberance 36a, during its revolution, changes in the engagement position with the pawl 6, the aforesaid overlap is compensated to affect the swinging motion of clutch lever 4. However, the engagement position of pawl 6 with protuberance 36a is always fixed due to the fact that, at the pawl 6, the aforesaid line l is set to be smaller than the lines $l_1$ and $l_2$, whereby the aforesaid engagement position cannot shift to either end of engaging portion 62 at the pawl 6.

If the pawl 6 is set to have the angle $\theta$ close to 0 degrees, an extent of overlapping decreases, provides insufficient swinging motion for clutch lever 4, and if close to 90 degrees, the component $F_1$ becomes extremely small. Hence, such construction will be impractical.

Figure 8:
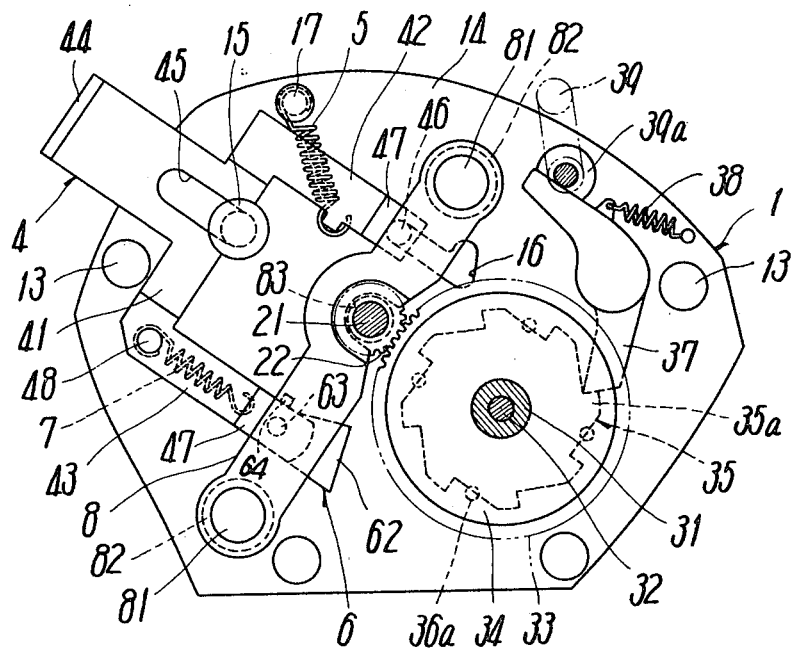
FIG. 8 is a partially omitted side view of a modified embodiment.

In addition, the pawl 6, as shown in FIG. 8, can be provided with restricting portion 64 which abuts against the clutch lever 4 to restrict the pawl 6 from further swinging toward the axis of rotation of return plate 6. In this instance, the aforesaid setting conditions are not necessary. Alternatively, the restricting portion 64 may be provided at the clutch lever 4.

As seen form the above, the clutch control mechanism for the fishing reel of the invention can smoothly disconnect the clutch means by forward movement of the clutch lever, because the pawl at the clutch lever can escape from the protuberance even when the pawl enters into the path of a revolving protuberance and strikes it. The return plate rotates to engage the protuberance with the pawl, so that the pawl allows the clutch lever to swing in the direction reverse to its retainment at the forward movement end and be released to move backward by use of the first spring, thereby ensuring a coupling of the clutch means. Since the pawl is provided at the utmost end of the clutch lever positioned at the fishing rod mounting side, the clutch lever is provided at the fishing rod mounting side and the anti-reverse-rotation mechanism is at the opposite side, whereby a large space is not necessary and the reel is made compact as a whole. Also, the anti-reverse-rotation mechanism at the side opposite to the fishing rod, enables an angler to facilitate his changeover operation of the same.

While preferred embodiments of the invention have been described using specific terms, such description is for illustrative purposes only, and it is to be understood that changes and variations may be made without departing from the spirit or scope of the invention which is defined in the following claims.

What is claimed is:
1. A fishing reel comprising:
a stationary member;
a handle rotatably supported to said stationary member;
a spool having a spool shaft which is rotatably supported to said stationary member;
a transmitting mechanism for transmitting a rotating driving force from said handle to said spool shaft and including a clutch means for selectively interrupting a transmission path in said transmitting mechanism;
a clutch control mechanism for operating said clutch means and comprising: a clutch lever for on-off controlling said clutch means, a pawl swingably supported to a forward end of said clutch lever, means for mounting said clutch lever to said stationary member so as to permit said clutch lever to move forwardly, backwardly and swingably during on-off control of said clutch means, a retaining mechanism for retaining said clutch lever at a forward movement end position thereof, a first spring for biasing said clutch lever in a backward movement direction thereof and in a first swinging direction which permits said clutch lever, when moved forwardly, to swing and be retained by said retaining mechanism at said forward movement end position, and a rotatable return plate having a plurality of protuberances thereon which rotate with said return plate in response to a rotating movement of said transmitting mechanism, said protuberances, when said clutch lever is retained by said retaining mechanism, engaging with said pawl at said clutch lever to swing said clutch lever in a second swinging direction opposite to said first swinging direction to release retainment of said clutch lever by said retaining mechanism, said pawl having a base pivoted to said clutch lever and at its distal end an engaging portion for engaging with a said protuberance, said retaining mechanism including a guide means which allows said clutch lever, when in proximity to the end of its forward movement, to swing under action of said first spring in said first swinging direction to move said engaging portion of said pawl in a direction of approaching an axis of rotation of said return plate, said clutch lever supporting a second spring for biasing said pawl to a neutral swinging position, whereby if said engaging portion of said pawl engages with a said protuberance as it approaches said axis of rotation during swinging of said clutch lever in said first direction, said pawl rotates against the biasing of said second spring to permit said clutch lever to continue to swing and to be retained by retaining mechanism.

2. A fishing reel according to claim 1, wherein one of said clutch lever and pawl, has a restricting portion which restrains the amount said pawl can swing during movement of said engaging portion in a direction of approaching the axis of rotation of said plate.

3. A fishing reel according to claim 1, wherein a length of a straight line connecting the position where said engaging portion abuts against one of said protuberances and the center of swinging motion of said pawl, is made smaller in length than each of respective straight lines connecting said engaging portion at both sides of said abutting position with a center of swinging motion of said pawl.

* * * * *